United States Patent
Lim et al.

(10) Patent No.: US 10,390,347 B2
(45) Date of Patent: Aug. 20, 2019

(54) COMMUNICATION RESOURCE ALLOCATION IN WIRELESS NETWORKS

(71) Applicant: Alcatel Lucent, Boulogne-Billancourt (FR)

(72) Inventors: Seau Sian Lim, Swindon (GB); Sudeep Palat, Swindon (GB); Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 71 days.

(21) Appl. No.: 15/306,939

(22) PCT Filed: Jan. 19, 2015

(86) PCT No.: PCT/EP2015/050884
§ 371 (c)(1),
(2) Date: Oct. 26, 2016

(87) PCT Pub. No.: WO2015/113849
PCT Pub. Date: Aug. 6, 2015

(65) Prior Publication Data
US 2017/0055250 A1    Feb. 23, 2017

(30) Foreign Application Priority Data
Jan. 30, 2014    (EP) .................................... 14305119

(51) Int. Cl.
*H04W 72/04*    (2009.01)
*H04L 5/00*    (2006.01)
(Continued)

(52) U.S. Cl.
CPC ......... *H04W 72/048* (2013.01); *H04L 5/0053* (2013.01); *H04W 74/006* (2013.01); *H04W 74/0833* (2013.01)

(58) Field of Classification Search
CPC ............. H04W 72/048; H04W 74/006; H04W 74/0833; H04L 5/0053
See application file for complete search history.

(56) References Cited

U.S. PATENT DOCUMENTS

| | | | |
|---|---|---|---|
| 2012/0052898 A1* | 3/2012 | Hegge | H04W 74/04 455/511 |
| 2014/0079011 A1 | 3/2014 | Wiberg et al. | |

(Continued)

FOREIGN PATENT DOCUMENTS

| | | |
|---|---|---|
| EP | 2680656 A1 | 1/2014 |
| WO | WO-2012-150883 A1 | 11/2012 |

OTHER PUBLICATIONS

International Search Report PCT/ISA/210 for International Application No. PCT/EP2015/050884 dated Apr. 14, 2015.
(Continued)

*Primary Examiner* — Jay P Patel
(74) *Attorney, Agent, or Firm* — Harness, Dickey & Pierce, P.L.C.

(57) ABSTRACT

A wireless communication network that supports low complexity devices is disclosed. In this network the plurality of preamble resources are allocated by a network node. The preambles are divided into sets, a first set of the preambles being for use by user equipment that is not low complexity user equipment; and a second set of the preambles being for use by low complexity user equipment and on occasion indicated by the network node, for use by user equipment that is not low complexity user equipment. Information on the allocation of preamble resources being broadcast to user equipment; and in response to receipt of one of the second set of preambles, signals are transmitted from the network node that are limited to transport blocks of less than a predetermined size.

14 Claims, 4 Drawing Sheets

(51) Int. Cl.
*H04W 74/00* (2009.01)
*H04W 74/08* (2009.01)

(56) References Cited

U.S. PATENT DOCUMENTS

2014/0098761 A1* 4/2014 Lee .................... H04W 74/006
370/329
2015/0289291 A1* 10/2015 Liu ....................... H04W 74/08
370/329

OTHER PUBLICATIONS

New Wi: Low cost & enhanced cverage MTC UE for LTE-Feature part, 3GPP TSG RAN meeting #60, Oranjestad, Aruba, Jun. 10-14, 2013, 5 pages.

New Wi: Low cost & enhanced cverage MTC UE for LTE-Core part, 3GPP TSG RAN meeting #60, Oranjestad, Aruba, Jun. 10-14, 2013, 7 pages.

New Wi: Low cost & enhanced cverage MTC UE for LTE-Performance part, 3GPP TSG RAN meeting #60, Oranjestad, Aruba, Jun. 10-14, 2013, 5 pages.

* cited by examiner

|   |                      | Non-MTC UE (i.e. normal UE) | Low-Complexity MTC UE | Non-Low-Complexity MTC UE (i.e. normal MTC UE) |
|---|----------------------|-----------------------------|-----------------------|-----------------------------------------------|
| 1 | Coverage enhanced    | NA                          | Yes                   | Yes                                           |
| 2 | Non-coverage enhanced| Yes                         | Yes                   | Yes                                           |

Table 1

FIG. 4

COMMUNICATION RESOURCE ALLOCATION IN WIRELESS NETWORKS

CROSS-REFERENCE TO RELATED APPLICATIONS

This application is a national phase under 35 U.S.C. § 371 of PCT International Application No. PCT/EP2015/050884 which has an International filing date of Jan. 19, 2015, which claims priority to European Application No. 14305119.1, filed Jan. 30, 2014, the entire contents of each of which are hereby incorporated by reference.

FIELD OF THE INVENTION

The field of the invention relates to the allocation of communication resources and in particular to the allocation of preambles in a wireless network.

BACKGROUND

Wireless communication networks were traditionally used to allow communication with mobile telephones. However, they are increasingly being used for the transmission of other information. One type of device that uses such wireless networks is a machine type communication MTC device that is used for the communication of information from machines, for example from smart utility meters. Such devices may have very different requirements to mobile telephones. One feature of such devices is that they are often not mobile and may be located in areas of high signal attenuation such as a basement making communication between a network node and the device difficult. An enhanced coverage communication mode has been devised to address this, wherein during an enhanced coverage mode of operation certain messages are sent repeatedly allowing the information to be accumulated and be decoded.

A base station or network node will broadcast to user equipment within range details of the network and of how to connect to it. A user equipment will signal to the base station that it wishes to connect to the network using one of a predetermined number of preambles. These preambles are a specific pattern or signature which is used by the network node to differentiate requests coming from different user equipment. There can be contention if two user equipment select to use a same preamble during a same time period. Some of the available preambles may be reserved for use exclusively by a certain type of user equipment. This is one way of indicating the type of user equipment to the network node where it is important that the network node is aware of the type of user equipment as it may impact the type of signalling the user equipment can decode. However, given that the number of available preambles is limited, reserving preambles for certain types of user equipment may waste preamble resources and increase the likelihood of collision, particularly where there are currently not many of that particular type of user equipment using a network.

It would be desirable to be able to identify a type of user equipment while not placing too large a burden on the available preamble resources.

SUMMARY

A first aspect of the present invention provides a method of allocating a plurality of preamble resources by a network node within a wireless communication network, said plurality of preamble resources each comprising a predetermined code that is used by said network node for differentiating access requests coming from different user equipment, said method comprising: allocating a first set of said preambles for use by user equipment that is not low complexity user equipment; allocating a second set of said preambles for use by said low complexity user equipment and indicating whether said second set of preambles can be used by said user equipment that is not said low complexity user equipment; broadcasting information on said allocation of preamble resources to user equipment; and in response to receipt of one of said second set of preambles, transmitting signals that are limited to transport blocks of less than a predetermined size.

As noted previously wireless communication networks are increasingly being used by different types of devices with different requirements. As some of these devices, particularly machine type communication or MTC devices may not access the network very often and may only send a limited amount of data when they do, it may be advantageous to specify a new type of user equipment for such operation that allows both for enhanced coverage and simpler or lower complexity devices. Such devices may be termed low complexity or low cost MTC devices.

The reduction of cost comes about by limiting the capability of the MTC UE. For example the transport block size for uplink and downlink can be limited, allowing a reduced buffer size to be used within the device.

In order to support such UEs, the network node, or eNB needs to know the UE capability. For connected mode UE, it is not a problem as UE capability can be exchanged via dedicated signalling or from the core network. The main issues come about before the UE is connected (i.e. when it is in idle mode) and during transition from idle to connected mode before the UE capability is known to the eNB.

The present invention recognises that when a user equipment wishes to connect to a network a preamble is sent to the network node indicating that the user equipment wishes to connect, the preamble being used to identify the user equipment. There are a fixed number of preambles available for use, each preamble having a predefined sequence that the network node can recognise. If a user equipment has a particular requirement, such as a low complexity user equipment that can only process transport blocks of a certain size, then this information needs to be conveyed to the network node. One way of doing this might be to exclusively reserve some of the preambles for such user equipment, so that the network node would know on receipt of one of these preambles that a low complexity user equipment had sent the preamble and that appropriate signalling should therefore be used.

However, a disadvantage of this approach is that reserving certain preambles for particular types of user equipment reduces the number of preambles available to user equipment that is not of that particular type and increases the risk of collisions. This can be a particular problem where there are few low complexity devices attached to a network and yet a significant number of preambles reserved for this purpose.

The present invention recognises that although reserving preambles for low complexity devices ensures that communication with these devices is successful, user equipment that is not low complexity could actually also use these preambles and the low complexity devices would not be affected provided that signalling in response to a request with one of these preambles met the appropriate signalling requirements. In the case of low complexity user equipment that use transport blocks of less than a predetermined size, signalling that restricted the size of the transport blocks would meet the requirements. In this way an efficient use of preambles can be made while still achieving successful communication with the low complexity devices.

In some embodiments, the method further comprises: allocating a third set of said preambles for use in coverage enhanced mode by user equipment that is not low complexity user equipment; allocating a fourth set of said preambles for use in coverage enhanced mode by low complexity user equipment and indicating whether said fourth set of preambles can be used by said user equipment that is not said low complexity user equipment; signalling in response to receipt of a preamble from said fourth set of preambles being limited to signals having transport blocks of less than a predetermined size.

In addition to allocating preambles for use by user equipment and low complexity user equipment, preambles can also be allocated for use in coverage enhanced mode. Coverage enhanced mode is a mode that is used to allow user equipment in high attenuation areas to receive enhanced coverage such that they are more likely to be able to decode a signal. Coverage enhancement involves a repetition of messages that are sent both from the network node and from the user equipment, thereby allowing the repeated messages to be accumulated at the destination and improving the probability of the messages being able to be decoded and enhancing the coverage of the network. As coverage enhanced mode requires the network node and the user equipment to operate in a certain manner; that is, by repeating messages, it is important that the network node is aware when it connects with the user equipment that the user equipment requires this mode of operation. Thus, some preambles may be allocated for using coverage enhanced mode and, again, these may be split between those that are low complexity user equipment and those that are not low complexity user equipment. The preambles that are allocated for use by the low complexity equipment can again be used by other user equipment, provided that the signalling meets the requirements of the low complexity user equipment; in this case, the transport blocks have a limited size.

It should also be noted that devices that do not require coverage enhancement could also use the preambles reserved for coverage enhancement, however, in such a case the network node would initially at least repeatedly send messages to the user equipment. There is a significant overhead associated with this and thus, although in some cases it may be advantageous generally these preambles are exclusively reserved for coverage enhanced mode.

In some embodiments, the method comprises a further step of determining a current loading of said network by said low complexity user equipment and where this is above a predetermined level allocating at least some of said fourth set of preambles for exclusive use by said low complexity user equipment.

In some embodiments, the method comprises a further step of determining a current loading of said network by said low complexity user equipment and where this is above a predetermined level allocating at least some of said second set of preambles for exclusive use by said low complexity user equipment.

Although it may be advantageous to allow the allocation of preambles that are suitable for use by low complexity user equipment to other user equipment, where there are many low complexity equipment attached to the network then the problem of preamble resources being exclusively used by low complexity user equipment and not being available for other user equipment may not arise, as in fact these preambles would be required by the many low complexity user equipment present. Thus, it may be advantageous in such a case to allocate them for the exclusive use of low complexity user equipment at such a time. In such a case, the coverage enhanced mode low complexity user equipment preambles may also be allocated for the exclusive use of coverage enhanced low complexity devices.

In some embodiments, the method comprises a further step of determining a current loading of said network by said user equipment currently supporting coverage enhanced mode and where this is above a predetermined level allocating at least some of said third and fourth set of preambles for exclusive use by said user equipment currently supporting coverage enhanced mode.

As noted previously the coverage enhanced mode preambles could in some embodiments also be used by devices not operating in coverage enhanced mode, although this is spectrally inefficient and thus, in many cases may not be allowed. However, where it is allowed and the loading on the network by devices operating in coverage enhanced mode is above a predetermined level it may be advantageous to restrict their use to these devices such that in this case at least some of the preambles in the third and/or fourth set (depending on the current loading of the LC devices) may be reserved exclusively for use by devices operating in the coverage enhanced mode. This information would be signalled to the user device by the network node in some embodiments with the allocation information.

In some embodiments, signalling in response to receipt of one of said second set of preambles is limited to signals having transport blocks of less than a predetermined size and to a predetermined bandwidth.

The signalling that a particular preamble requires may be limited to different things, and in the case of low complexity devices it may be bandwidth as well as transport block size. In this regard the low complexity device may have a limited antenna and/or communication circuitry that cannot operate in a wide bandwidth.

Although the predetermined size of the transport block will depend on the type of low complexity user equipment and its buffer size. In this regard conventional user equipment such as a mobile phone may have a significant buffer size such that transport blocks of tens of thousands of bits can be used. In some embodiments the transport block size is limited to less than 8000 bits and in some cases to less than 5000 bits and in yet further cases to less than or equal to 1000 bits.

A second aspect of the present invention provides a network node configured to allocate a plurality of preambles within a wireless communication network, said plurality of preambles each comprising a predetermined code for identifying a user equipment transmitting said preamble, said network node comprising: allocation logic configured to: allocate a first set of said preambles for use by user equipment that is not low complexity user equipment; and allocate a second set of said preambles for use by low complexity user equipment and to indicate whether said second set of preambles can be used by said user equipment that is not said low complexity user equipment, signalling in response to one of said second set of preambles being limited to signals having transport blocks of less than a predetermined size; broadcasting circuitry configured to broadcast information on said allocation of preamble resources to user equipment.

A third aspect of the present invention provides a user equipment for communicating via a wireless network, said user equipment comprising: a receiver configured to receive system information regarding said wireless network from a network node; selection logic configured to select a preamble for transmission of access messages using preamble allocation information received from said network node, said preamble allocation information comprising a first set of said preambles indicated as being for use by user equipment that is not low complexity user equipment; and a second set of said preambles indicated as being for use by low complexity user equipment and said user equipment that is not said low complexity user equipment; wherein said user equipment not being a low complexity user equipment, and selecting and transmitting one said preambles from said second set, receiving signals in response that are limited to transmission blocks of less than a predetermined size.

Where a non-low complexity user equipment wishes to connect to a network, it will select a preamble for transmission of access messages using the preamble allocation information it has received from the network node. In this case, there will be a first set of preambles which are indicated as being for use by it and there will be a second set that it can use but that is also for use by low complexity user equipment. Where it selects one of these, any signals that it then receives will be limited to transmission blocks of less than a predetermined size. Thus, rather than being prohibited from selecting one of these preambles, as in the prior art, these preambles will be available for its use but any transmissions will be restricted. The selection of preambles is generally performed in a random manner from those that are available.

A fourth aspect of the present invention provides a method performed by non-low complexity user equipment communicating via a wireless network comprising: receiving system information regarding said wireless network from a network node, said system information comprising preamble allocation information comprising a first set of preambles indicated as being for use by user equipment that is not low complexity user equipment; and a second set of preambles indicated as being for use by low complexity user equipment and said user equipment that is not said low complexity user equipment; selecting one of said preambles for transmission of access messages; Wherein signals received in response to a preamble selected from said second set of preambles are limited to transmission blocks of less than a predetermined size.

A fifth aspect of the present invention provides a computer program which, when executed by a data processing apparatus, controls said data processing apparatus to perform steps in a method according to a first or fourth aspect of the present invention.

A sixth aspect of the present invention provides a computer program product comprising a computer program which, when executed by a data processing apparatus, controls said data processing apparatus to perform steps in a method according to a first or a fourth aspect of the present invention.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Before discussing the embodiments in any more detail, first an overview will be provided.

When accessing a network using the random access mechanism the eNB needs to know whether the user equipment UE is a low complexity machine type communication device LC MTC UE and/or requires coverage enhanced mode. In the case of LC MTC UE, the eNB needs to know to send the RAR (random access response, Message 2) within the 1.4 MHz PDSCH (physical downlink shared channel) transmission bandwidth and to ensure that it is not more than 1000 bits TBS (transport block size). In the case of coverage enhanced mode UE, the eNB needs to start accumulation of the preamble (Message 1).

Thus, advantageously it is indicated via a non-exclusive set of preambles or time-frequency resources that the UE may be LC MTC UE and the eNB, upon receiving one of these preambles or preamble in one of the time-frequency resources, assumes that the UE is LC MTC UE and sending the RAR within the required, say, 1.4 MHz PDSCH transmission bandwidth and ensures that it is sent in transport block sizes that are not too large. However, unlike the prior art, these preambles or time-frequency resources are not exclusive to LC MTC UE and can also be used by non-MTC and non-LC MTC UE (normal and legacy UE). This will allow the full range of preambles to be used by normal UEs, thus avoiding wastage of preamble resources in the case where there is low number of LC MTC UE in the cell and allowing more preamble resources for normal UE to reduce preamble collision probability.

Figure 4:
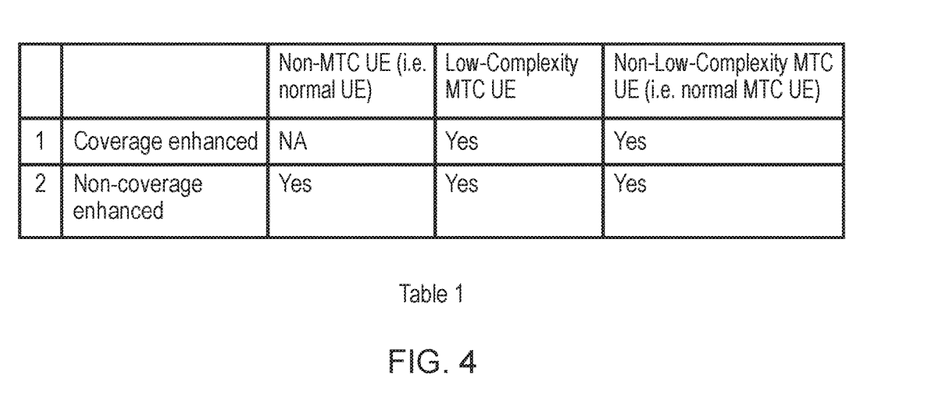
FIG. 4 shows a table illustrating the availability of preambles for different user equipment

See Table 1, Row 2 of FIG. 4. From the signalling point of view, the preamble or time-frequency resources signalled for the non-MTC and non-LC MTC UE can overlap with the preamble or time-frequency resources signalled for the LC-MTC UE.

Coverage enhanced UE can be non-LC MTC UE and LC MTC UE. The set of preambles or time-frequency resources for the LC MTC UE in coverage enhanced mode are also non-exclusive to the non-LC MTC UE in enhanced coverage mode (i.e. normal MTC UE with coverage enhanced mode without bandwidth & TBS restrictions), can also use the set of preambles or time-frequency resources for LC MTC on top of the preamble and/or time-frequency resources assigned to normal MTC UE with coverage enhanced mode see table 1, Row 1, of FIG. 4).

From the signalling point of view, the preamble or time-frequency resources signalled for the non-MTC and non-LC MTC UE with enhanced coverage mode can overlap with the preamble or time-frequency resources signalled for the LC-MTC UE with enhanced coverage mode.

The eNB is in control of the use of the preamble or time-frequency resources and it can control whether the PRACH (physical random access channel) resources should be exclusively or non-exclusively used by the LC-MTC UE.

An indication can be sent by the eNB to indicate to all UEs and this can be done implicitly via the PRACH resource signalling or explicitly via an explicit indication. In the implicit case: to indicate exclusive usage, the eNB just needs to ensure that the PRACH resources allocated to LC MTC UE do not overlap with the PRACH resources allocated to the other UEs; to indicate non-exclusive usage, the eNB ensures that the PRACH resources allocated to LC MTC UE overlap with the PRACH resources allocated to the other UEs. In the explicit case: The explicit indication will indicate whether the other UE can use the same PRACH resources as the LC MTC UE. However, this may not be backward compatible.

Figure 1:
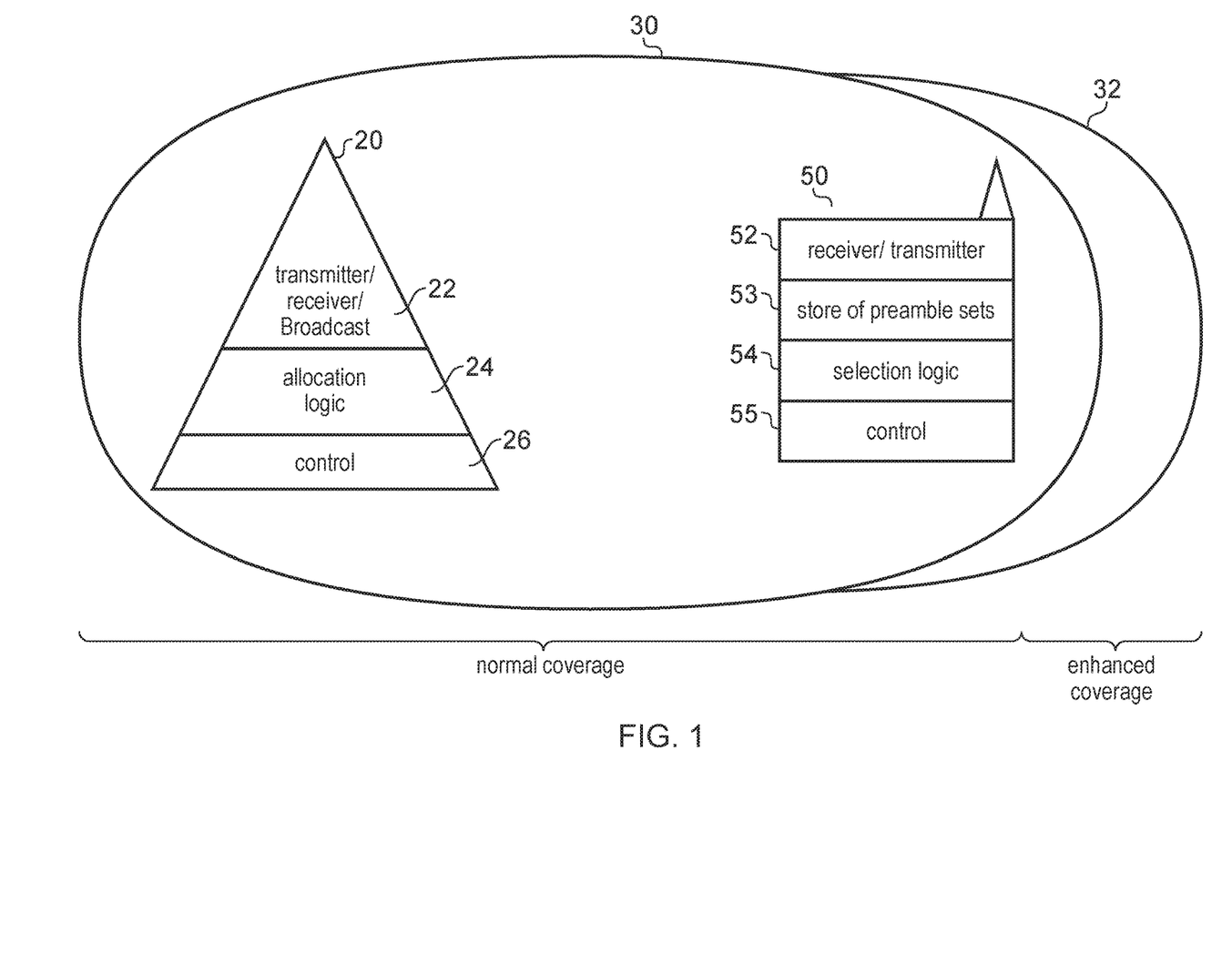
FIG. 1 illustrates a cell in a network with both normal and enhanced coverage.

FIG. 1 shows a network according to an embodiment of the present invention. The network comprises a base station 20 that provides a signal within a normal cell coverage 30 and when operating in extending coverage mode within an extended coverage cell 32. Extended coverage mode uses signal repetition such that devices in areas of high attenuation will transmit and receive signals repeatedly such that they can accumulate the signal and be able to decode it.

Base station or network node 20 has transmitter receiver circuitry and broadcast circuitry 22 for sending and receiving signals. In this regard, signals may be transmitted directly towards a particular user equipment that is connected to the network node or it may be paged to a particular user equipment that is not currently connected, using the user equipment identifier, or signals may be broadcast to all user equipment within the area. Examples of signals that are broadcast are MIB (Master Information Blocks) and SIB (System Information Blocks) which provide information about the network and allow a user equipment requiring a connection to be able to retrieve the information and thereby request a connection using the appropriate signals. The network node also has allocation logic 24 for allocating preambles for use by particular user equipment requesting access to the network. In this regard, when a user equipment wishes to connect to the network it needs to signal an identity to the network node indicating who it is and that it is initiating the random access request.

There are increasingly different types of user equipment that wish to connect to the network node and some of these have particular requirements. Thus, it may be advantageous if these requirements can be indicated to the network node when connecting, such that the network node can use the appropriate signalling when responding allowing the user equipment can receive and decode this information. However, reserving preambles for a particular user equipment limits the number of preambles available and increases the risk of collision whereby two user equipment use the same preamble for an access request at the same time.

Allocation logic 24 allocates the preambles to particular types of user equipment. Thus, in this example the allocation logic 24 allocates the preambles into four different sets. A first set of preambles are for use by traditional user equipment that are not operating in a coverage enhanced mode. A second set is for use by machine type communication devices of a low complexity; that is, LC MTC devices. These devices do not have the capabilities of some so-called normal user equipment (such as a mobile phone), as they are only required to receive and transmit limited amounts of data; they may, for example, be a smart meter simply transmitting the reading from the meter. Thus, they may be built with small buffer sizes to decrease their costs such buffer sizes being appropriate for their task. However, if the network node 20 is unaware of the buffer size then it may communicate using transport blocks that are too large for the user equipment to buffer and it will not be able to decode the signal. Therefore, a set of preambles is allocated by allocation logic 24 for the use of these LC MTC user equipment. However, in order to avoid collisions, they are not allocated for the exclusive use of these particular user equipment but are available to non LC MTC devices. Where the other devices select one of these preambles, transmissions to them will also be limited to a transport block size of, in some cases, less than 1000 bits.

Allocation logic 24 may also allocate two other sets of preambles; a third and fourth set which are available for coverage enhanced mode, wherein messages are repeated in order for them to be successfully received. Once again, it is important that this is known so that the preamble is sent repeatedly and the network node knows to start accumulating it. The third set of coverage enhanced preambles is allocated to traditional non coverage enhanced user equipment, whilst the fourth set is allocated to coverage enhanced low complexity devices.

Once again, the fourth set is not generally exclusively allocated to these devices, but if this preamble is used the transport block sizes are limited, as it is unknown if the device using the preamble is a low complexity device or otherwise and a signal sent must be one that can be decoded by both sets of devices. Furthermore, both the third and the fourth set may in some embodiments be allocated to user equipment not currently supporting coverage enhanced mode and in such a case the signals will be sent repeatedly to these devices as that is the requirement indicated by the preamble being in that set.

In this embodiment, there is also control logic 26 which is configured to determine the loading of the network and, in particular, the number of low complexity devices both in coverage enhanced and non coverage enhanced mode currently in operation. Where this is above a predetermined number, the second and/or fourth set of preambles can be exclusively allocated to low complexity devices. In this case, as the loading of the low complexity devices is high then it is advantageous that they are allocated to the low complexity devices specifically, as this is an efficient allocation of the preambles and avoids the slightly less efficient scenario of normal user equipment only being able to receive transport blocks of limited size. Similarly, where there are many devices in coverage enhanced mode these may also be exclusively allocated for use by devices currently supporting coverage enhanced mode, and indeed in many cases they will always be exclusively allocated for use by devices currently supporting coverage enhanced mode.

FIG. 1 also shows user equipment 50 having a transmitter/receiver 52 and selection logic 54. User equipment 50 receives the information regarding preamble allocation from the network node and stores it in data store 53. When it wishes to communicate with the network node, it will select using selection logic 54 an appropriate preamble from the set stored. Where it is a non low complexity MTC device that is, say, operating in coverage enhanced mode, it will select one of the preambles from preamble set three or four. If it selects a preamble from set four then all transmissions that it receives from network node 20 will be limited in size to transport blocks having a size of less than 1000 bits. The operation of the user equipment 50 is controlled by control logic 55.

Figure 2:
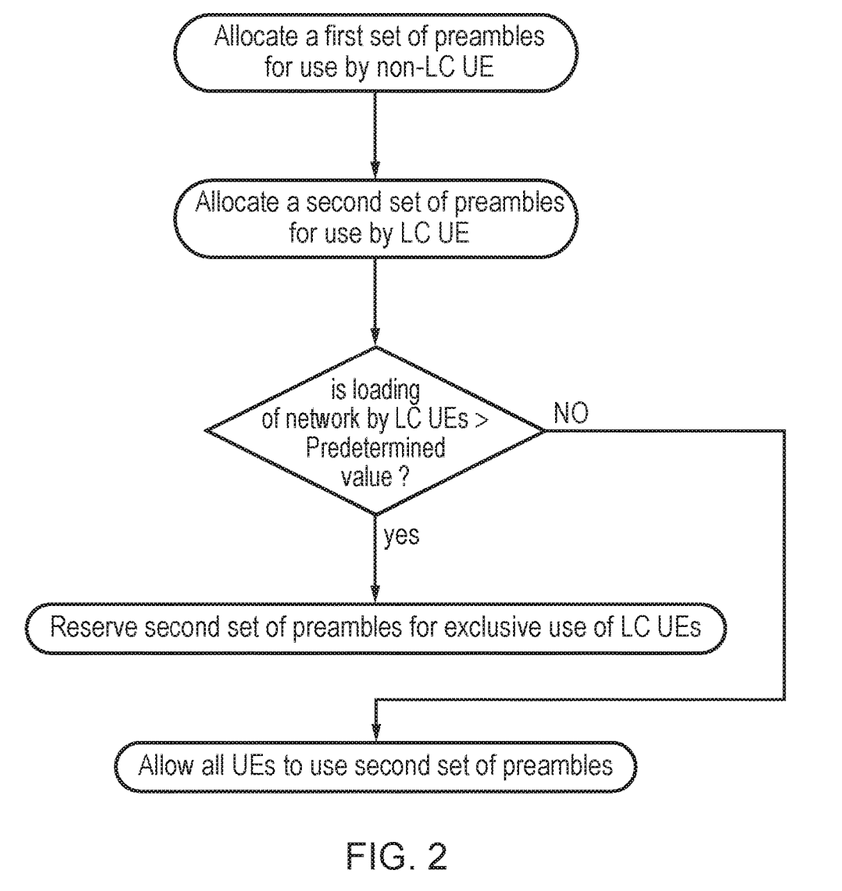
FIG. 2 illustrates a flow diagram showing steps in a method for allocating preambles for use by low complexity devices.

FIG. 2 shows a method performed by a network node according to an embodiment of the present invention. Initially, a first set of preambles is allocated for use by non LC UE and a second set of preambles is allocated for use by LC UE. It is then determined if a loading of the network of by the LC UEs is greater than a predetermined value. If the answer to this is yes, some of the second set of preambles is reserved for exclusive use by the low complexity devices. If, however, the answer is no, then the second set of preambles is available for use by all types of UE, although it should be noted that signals sent to these UE that have used this preamble will have transport block sizes that are limited to the value that is required by the low complexity device. This may be 1000 bits.

It is then determined if the loading of the network is higher than a second higher value and if it is more and indeed in some cases all of the second set of preambles will be reserved for the exclusive use of low complexity devices.

Figure 3:
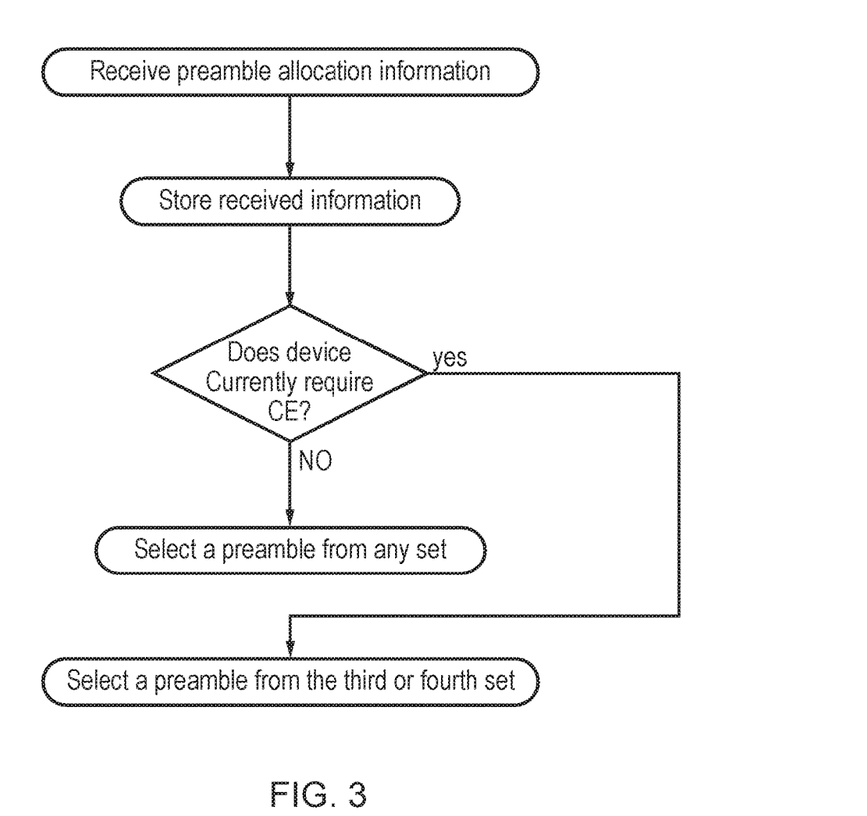
FIG. 3 illustrates a flow diagram showing steps in a method for allocating preambles for use in coverage enhanced mode.

FIG. 3 shows a flow diagram illustrating steps in a method performed by a non LC MTC UE device, according to an embodiment of the present invention. Initially it receives the preamble allocation information and stores this on the device. It then determines whether it requires coverage enhanced mode or not. In this regard it may be a device that supports coverage enhanced mode but is mobile and thus, it detects the strength of the signal received from the base station to determine whether it will require coverage enhanced mode to communicate or not. If it does then it will select a preamble from the third or fourth set of preambles and if it does not it will select one from the first or second set. In this regard, in the current embodiment the LC preambles are also available to non-LC devices. Where it selects a preamble from the fourth set for example messages it receives will be limited in transport block size and bandwidth and will be repeated.

If the network is currently experiencing high loading from LC devices then the allocation information it receives will indicate that the second and perhaps fourth set of preambles are exclusively reserved for LC devices and it will select a preamble from the first set if it is non-coverage enhanced mode and third if it is in coverage enhanced mode.

FIG. 4 shows a table illustrating how the different modes and devices may or may not overlap when preambles are allocated. Thus, preambles that are allocated for coverage enhanced mode can be used by both low complexity and non-low complexity devices. Non-coverage enhanced mode preambles can be used by all types of devices, although it is clearly most efficient for these ones to use preambles that do not have limited transport block sizes and that do not require repetition of messages. However, other preambles can be selected which allow great flexibility in the selection of preambles and decrease collisions.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of allocating a plurality of preamble resources by a network node within a wireless communication network, said plurality of preamble resources each comprising a code for differentiating access request coming from different user equipment, said method comprising:
   allocating a first set of said preambles for use by user equipment that is not low complexity user equipment;
   allocating a second set of said preambles for use by said low complexity user equipment and indicating whether said second set of preambles can be used by said user equipment that is not said low complexity user equipment;
   determining a current loading of said network by said low complexity user equipment;
   allocating at least some of said second set of preambles for exclusive use by said low complexity user equipment if the determined current loading is above a first level;
   broadcasting information on said allocation of preamble resources; and
   in response to receipt of one of said second set of preambles, transmitting signals that are limited to transport blocks of less than a desired size.

2. A method according to claim 1, further comprising:
allocating a third set of said preambles for use in coverage enhanced mode by user equipment that is not low complexity user equipment;
allocating a fourth set of said preambles for use in coverage enhanced mode by low complexity user equipment and indicating whether said fourth set of preambles can be used by said user equipment that is not said low complexity user equipment;
signalling in response to receipt of a preamble from said fourth set of preambles being limited to signals having transport blocks of less than the desired size.

3. A method according to claim 2, further comprising:
allocating at least some of said fourth set of preambles for exclusive use by said low complexity user equipment if the determined current loading is above a second level.

4. A method according to claim 1 wherein said low complexity user equipment comprises a machine type communication device.

5. A method according to claim 1, wherein signalling in response to receipt of one of said second set of preambles is limited to signals having transport blocks of less than the desired size and to a bandwidth.

6. A method according to claim 1, wherein the desired size of said transport blocks is one of 8000 bits, 5000 bits or 1000 bits.

7. A computer program product storing a computer program which when executed by a data processing apparatus controls said data processing apparatus to perform the method according to claim 1.

8. A network node configured to allocate a plurality of preambles within a wireless communication network, said plurality of preambles each comprising a code for identifying a user equipment transmitting said preamble, said network node comprising:
a memory configured to store instructions;
a processor configured to execute the instructions to,
allocate a first set of said preambles for use by user equipment that is not low complexity user equipment,
allocate a second set of said preambles for use by low complexity user equipment and to indicate whether said second set of preambles can be used by said user equipment that is not said low complexity user equipment, signalling in response to one of said second set of preambles being limited to signals having transport blocks of less than a desired size,
determine a current loading of said network by said low complexity user equipment, and
allocate at least some of said second set of preambles for exclusive use by said low complexity user equipment if the determined current loading is above a first level; and
broadcasting circuitry configured to broadcast information on said allocation of preamble resources.

9. A network node according to claim 8, said processor being further configured to:
allocate a third set of said preambles for use in coverage enhanced mode by user equipment that is not low complexity user equipment;
allocate a fourth set of said preambles for use in coverage enhanced mode by low complexity user equipment and indicate whether said fourth set of preambles can be used by said user equipment that is not said low complexity user equipment, signalling in response to one of said fourth set of preambles being limited to signals having transport blocks of less than the desired size.

10. A network node according to claim 9, wherein said processor is configured to:
allocate at least some of said fourth set of preambles for exclusive use by said low complexity user equipment if the determined current loading is above a second level.

11. A network node according to claim 8, wherein said low complexity user equipment comprises a machine type communication device.

12. A network node according to claim 8, said network node being configured when transmitting signals in response to receipt of one of said second set of preambles, to limit said signals to transport blocks of less than the desired size and to a bandwidth.

13. A user equipment for communicating via a wireless network, said user equipment comprising:
a receiver configured to receive system information regarding the wireless network from a network node;
a memory configured to store instructions;
a processor configured to execute instructions to,
select a preamble for transmission of access messages using preamble allocation information received periodically from the network node, the preamble allocation information including a first set of preambles indicated as being for use by user equipment that is not low complexity user equipment; and either a second set of preambles indicated as being for use by low complexity user equipment and user equipment that is not low complexity user equipment or at least a subset of the second set of preambles as being for use solely by the low complexity user equipment, wherein selecting the preambles is dependent upon the received preamble allocation information;
wherein the user equipment is not a low complexity user equipment; and
wherein the processor selects one of the preambles in the second set, the user equipment receives signals in response to one of the preambles in the second set that are limited to transmission blocks of less than a desired size.

14. A method performed by non low complexity user equipment communicating via a wireless network comprising:
receiving system information regarding said wireless network from a network node, said system information including preamble allocation information including,
a first set of preambles indicated as being for use by user equipment that is not low complexity user equipment,
a second set of preambles indicated as being for use by low complexity user equipment and user equipment that is not low complexity user equipment, and
an indication that at least a subset of said second set of preambles is available for use only by said low complexity user equipment;
selecting one of said preambles for transmission of access messages from said first set of preambles or said second set of preambles not within said at least a subset; wherein
signals received in response to a preamble selected from said second set of preambles are limited to transmission blocks of less than a desired size.

* * * * *

UNITED STATES PATENT AND TRADEMARK OFFICE
CERTIFICATE OF CORRECTION

PATENT NO. : 10,390,347 B2  
APPLICATION NO. : 15/306939  
DATED : August 20, 2019  
INVENTOR(S) : Seau Sian Lim et al.

Page 1 of 2

It is certified that error appears in the above-identified patent and that said Letters Patent is hereby corrected as shown below:

On the Title Page

Delete "14 Claims, 4 Drawing Sheets" and insert --15 Claims, 4 Drawing Sheets--

In the Claims

Please replace Claim 7, which begins on Column 11, Line 27 and ends on Column 11, Line 30, as follows:
7. A network node configured to allocate a plurality of preambles within a wireless communication network, said plurality of preambles each comprising a code for identifying a user equipment transmitting said preamble, said network node comprising:
    a memory configured to store instructions;
    a processor configured to execute the instructions to,
        allocate a first set of said preambles for use by user equipment that is not low complexity user equipment,
        allocate a second set of said preambles for use by low complexity user equipment and to indicate whether said second set of preambles can be used by said user equipment that is not said low complexity user equipment, signalling in response to one of said second set of preambles being limited to signals having transport blocks of less than a desired size,
        determine a current loading of said network by said low complexity user equipment, and
        allocate at least some of said second set of preambles for exclusive use by said low complexity user equipment if the determined current loading is above a first level; and broadcasting circuitry configured to broadcast information on said allocation of preamble resources.

Please add Claim 15 after Claim 14:
15. A non-transitory computer-readable medium including computer executable instructions that, when executed by at least one processor included in a Signed and Sealed this  
Twenty-sixth Day of May, 2020

Andrei Iancu  
*Director of the United States Patent and Trademark Office* network node, causes the network node to perform a method comprising: allocating a first set of said preambles for use by user equipment that is not low complexity user equipment;

allocating a second set of said preambles for use by said low complexity user equipment and indicating whether said second set of preambles can be used by said user equipment that is not said low complexity user equipment;

determining a current loading of said network by said low complexity user equipment;

allocating at least some of said second set of preambles for exclusive use by said low complexity user equipment if the determined current loading is above a first level;

broadcasting information on said allocation of preamble resources; and in response to receipt of one of said second set of preambles, transmitting signals that are limited to transport blocks of less than a desired size.